April 8, 1941.  N. E. ROUTSON  2,237,915
SHOCK ABSORBER
Filed Oct. 23, 1939
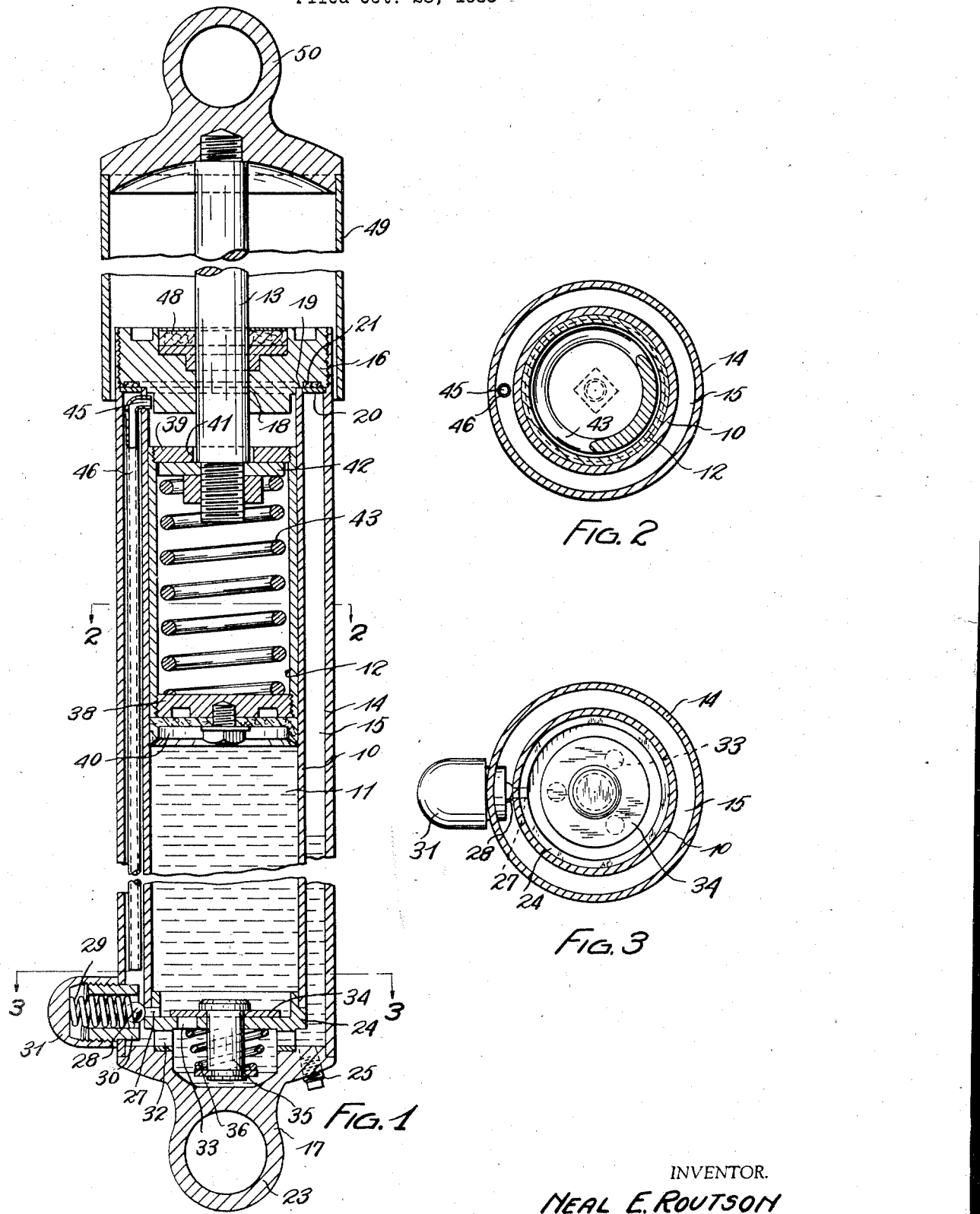
INVENTOR.
NEAL E. ROUTSON
BY Kwis Hudson & Kent
ATTORNEYS Patented Apr. 8, 1941

2,237,915

UNITED STATES PATENT OFFICE 2,237,915

SHOCK ABSORBER

Neal E. Routson, Lakewood, Ohio, assignor to Lucien R. Gruss, Cleveland, Ohio

Application October 28, 1939, Serial No. 301,820

4 Claims. (Cl. 267—34)

This invention relates to fluid shock absorbers, and more particularly to an improved shock absorber of this type which is well suited for use on various kinds of motor vehicles for retarding or dampening movement between two relatively movable parts, such as the frame and axle of the vehicle.

An object of my invention is to provide an improved fluid shock absorber of the type having a movable piston for causing a discharge of fluid through a restricted passage or opening and in which the shock absorbing action resulting from such restricted discharge of fluid is supplemented by the action of a resiliently yieldable means embodied in the piston actuating means.

Another object of my invention is to provide an improved fluid shock absorber of the type having a movable piston for subjecting the resistance fluid to pressure and in which such piston is hollow and houses a resilient means by which an actuating member is connected with the piston and which functions as an auxiliary shock absorbing means.

A further object of my invention is to provide an improved vehicle shock absorber having a piston operable to force fluid through a restricted valve-controlled passage for developing a main shock absorbing action between relatively movable vehicle parts and having piston actuating means embodying a resiliently yieldable auxiliary shock absorbing means upon which the vehicle body substantially floats.

Other objects and advantages of my invention will be apparent from the following description when taken in conjunction with the accompanying sheet of drawings in which:

Fig. 1 is a longitudinal sectional view taken through a shock absorber embodying my invention;

Fig. 2 is a transverse sectional view taken through the device as indicated by line 2—2 of Fig. 1; and Fig. 3 is another transverse sectional view taken through the shock absorber on line 3—3 of Fig. 1.

In the embodiment of my invention illustrated in the drawing I show a shock absorber of the direct-acting tubular type, and although my invention is hereinafter described by making detailed reference to the construction and operation of a shock absorber of this particular type, it will be understood, however, that the invention may be embodied in various other kinds of shock absorbers and similar devices coming within the scope of the appended claims.

The shock absorber shown in the drawing includes an elongated tubular cylinder barrel 10 providing a working chamber or cylinder 11, and a piston 12 slidable in the cylinder barrel and adapted to be reciprocated therein by an operating member in the form of an actuating rod 13. A tubular reservoir cylinder or barrel 14 coaxially surrounds the cylinder barrel 10 so as to provide therebetween a reservoir chamber 15. The ends of the shock absorber housing or cylinder are formed by the plugs or cover members 16 and 17. The plug 16 may be connected with the outer or upper end of the reservoir barrel 14 by being screwed thereinto and is provided with an opening or bearing 18 in which the actuating rod 13 is slidable. The plug 16 is also provided with an annular seat 19 which is engaged by and locates the outer end of the cylinder barrel 10. A washer or ring 20 may be provided between the outer end of the cylinder barrel 10 and the reservoir barrel 14 and bears against a packing ring or gasket 21 for forming an annular fluid seal between the cylinder and reservoir chambers.

The plug or cover member 17 may be welded or otherwise connected to the inner or lower end of the reservoir barrel 14 and may have a connecting portion thereon, such as the eye 23, by which this end of the device may be connected with the axle or other movable part to be retarded. An inner cover member 24 may be located between the plug 17 and the inner or lower end of the cylinder barrel 10. This inner cover member serves to center and locate the lower end of the cylinder barrel 10 and enables the latter to be clamped in position between the plugs 16 and 17 when the parts are assembled and the plug 17 is welded or otherwise connected to the reservoir barrel 14. The plug 17 may also be provided with a filling opening which communicates with the reservoir 15 and may be closed by the screw plug 25.

Resistance fluid, such as oil or other appropriate liquid, substantially fills the working chamber extending between the piston 12 and the inner cover 24 and partially fills the reservoir chamber 15. The space in the reservoir chamber above the level of the liquid contains air which is compressed when the level of liquid rises in the reservoir, as will be explained more fully hereinafter.

For developing a shock absorbing resistance in the device, I provide a restricted discharge opening 27 adjacent the lower end of the cylinder barrel which extends between the working chamber 11 and the reservoir 15, but is normally closed by a check valve which opens outwardly when sufficient pressure is developed in the working chamber. This check valve may be in the form of a ball 28 seating against the outer end of the restricted passage 27 and yieldingly held thereagainst by the compression spring 29. A bushing 30 mounted in an opening of the reservoir barrel 14 forms a guide for the inner end of the spring and also serves as a connecting means for the spring housing 31. The force tending to hold the ball 28 seated can be varied or adjusted to thereby vary the shock absorbing resistance which is to be developed in the device and this can be done either by substituting a spring of different characteristics for the spring 29, or by screwing the spring housing 31 toward or from the reservoir barrel to vary the compression of the spring 29.

To obtain a quick return of fluid from the reservoir chamber 15 into the working chamber 11, I provide the inner cover 24 with relatively large return passages 32 and 33 and a check valve which normally closes the passage 33 but is adapted to open into the working chamber 11. This check valve may be in the form of a valve disk 34 having a stem or pin 35 extending through the inner cover 24 and may be normally held seated against the inner cover by the compression spring 36.

The piston 12 may comprise an elongated tubular body 12a which is slidable in the cylinder barrel 10 and is provided with end walls 38 and 39. The end wall 38 may carry a cup-shaped packing 40 formed of leather or other flexible material. The end wall 39 has an opening 41 through which the actuating rod 13 freely extends. This wall also forms a stop which is adapted to be engaged by an abutment, in this instance in the form of a disk 42, carried by the actuating rod during outward movement of the latter.

For developing an auxiliary shock absorbing action in my improved device, I may provide a resiliently yieldable operating connection between the rod 13 and the piston 12. To this end I provide a resiliently yieldable means in or on the hollow piston 12, in this instance in the form of a coiled compression spring 43, which is adapted to yield when a thrust or load is applied to the rod 13 in a direction to cause inward movement of the piston. The spring 43 may be housed in the hollow piston with its ends seating, respectively, against the end wall 38 of the piston and the abutment disk 42 of the actuating rod.

The resilient connection thus provided between the actuating rod 13 and the piston 12 serves as a cushioning and shock absorbing means upon which the weight of the vehicle, and of the passengers or load carried thereby is supported in a more or less floating manner. In this connection I wish to explain that the spring-loaded valve 28 maintains the restricted passage 27 closed until an excessive or predetermined pressure occurs in the working chamber 11 and, therefore, the initial thrust applied to the piston by the actuating rod 13 is taken up by yielding of the spring 43. With the characteristic of the springs 43 and 29, and the area of the restricted passage 27 and other parts of the device properly proportioned, the weight of the vehicle and its load will more or less float on the spring 43 and the body of liquid contained in the working chamber 11, but if a sudden or excessive thrust is applied to the actuating rod 13, as when the vehicle wheel encounters a bump, it will be transmitted through the spring 43 to the piston causing inward movement thereof and this will cause some of the resistance fluid to be discharged through the restricted passage 27 thereby resulting in a main shock absorbing resistance being developed in the device. During the compression of the spring 43 the abutment disk 42 moves into the piston away from the end wall 39 thereof and upon outward movement of the actuating rod 13, such as during lightening of the load carried by the vehicle or during rebound movement, the abutment disk 42 moves toward and engages the end wall 39 whereupon a positive retracting connection is formed between the actuating rod and piston.

To render my improved shock absorber double acting, I may provide the cylinder barrel 10 with a restricted discharge opening or passage 45 adjacent its upper end. This restricted opening may be formed by the opening in the end or mouth of the tube 46, or may be formed by the space intervening between the mouth of this tube and the adjacent portion of the plug 16. The tube 46 thus provides an open but restricted passage which connects the upper end of the working chamber or cylinder with the reservoir 15.

On upward or outward movement of the piston 12, particularly a sudden outward movement such as would occur during rebound, any body of liquid contained in the cylinder above the piston will be subjected to pressure and will be forced back into the reservoir through the restricted passage 45 thereby developing additional shock absorbing resistance in the device. The body of liquid which may exist or occur in the cylinder above the piston 12 may be liquid which has leaked between the piston and cylinder or it may be liquid which has been forced upward through the tube 46 during the inward or compression stroke of the piston.

The space in the reservoir chamber 15 above the level of the liquid contains air, as above stated, and when fluid is forced into the reservoir this air is compressed more or less and on the outward stroke of the piston tends to accelerate the return flow of fluid past the check valve 34. The air pressure thus built up in the reservoir also causes fluid to be forced up through the tube 46 into the cylinder above the piston so as to provide fluid in the upper cylinder chamber for retarding rebound movement of the piston.

It will be noted that the tube 46 is of substantial length and that its lower end extends well below the level of liquid in the reservoir and to a point adjacent the valve-controlled restricted passage 27. This is desirable because it permits liquid to be forced up through the tube 46 into the upper end of the cylinder during the compression stroke of the piston, as above explained, and also tends to prevent agitation of the reservoir liquid and the formation of an air and oil emulsion when liquid is discharged back into the reservoir from the upper end of the cylinder through the restriction 45.

The escape of liquid from the device around the actuating rod 13 may be prevented by providing a suitable packing 48 in the plug 16 outwardly of the bearing 18. Dust and other foreign matter may be excluded from the vicinity of the actuating rod and the packing 48 by means of a tubular dust shield 49 which telescopes the reservoir barrel 14 and is connected with the end of the actuating rod by means of the fitting 50 by which the actuating rod is adapted to be connected with the vehicle frame or other movable part to be retarded.

From the foregoing description and the accompanying drawing it will now be readily understood that I have provided an improved shock absorber of the fluid type which is well suited for use on various kinds of motor vehicles and which is so constructed that the weight of the vehicle and the load carried thereby will be supported in a more or less floating manner by the shock absorber. It will also be seen that this floating of the vehicle and its load is brought about by the use of a normally closed restricted fluid passage and a resiliently yieldable operating connection between the actuating rod and piston. This yieldable operating connection between the actuating rod and piston not only serves to float the weight and load of the vehicle, but also serves as an auxiliary shock absorbing means which cushions and absorbs the relatively lighter shocks and vibrations. It will also be seen that my improved shock absorber is a double-acting device and that the more sudden and severe shocks will be absorbed by the forced discharge of liquid through the restricted openings of the device.

While I have illustrated and described my improved shock absorber in a more or less detailed manner, it will be understood, of course, that I do not wish to be limited to the construction and functioning of the particular shock absorber herein disclosed, but regard my invention as including such changes and modifications as do not constitute a departure from the spirit of the invention and the scope of the appended claims.

Having thus described my invention, I claim:

1. In a double-acting shock absorber, a cylinder, a reservoir, resistance fluid in the cylinder and reservoir, a piston operable in the cylinder for subjecting the fluid to pressure, said cylinder having restrictions adjacent its respective ends through which fluid may be discharged into the reservoir by the piston, an actuating member extending into the cylinder, and means providing a positive connection between the piston and actuating member for movement of the piston toward one of said restrictions and a yieldable connection therebetween for movement of the piston toward the other of said restrictions.

2. In a double-acting shock absorber, an elongated cylinder, an elongated reservoir surrounding the cylinder, resistance fluid in the cylinder and reservoir, an elongated hollow piston operable in the cylinder, said cylinder having restrictions adjacent its respective ends through which fluid may be discharged into the reservoir by the piston, an actuating rod extending into the cylinder and hollow piston, an abutment on said rod engageable with the piston to form a positive connection therebetween for movement of the piston toward one of said restrictions, and a coiled spring in the piston for yieldingly transmitting thrust between said rod and piston during movement of the piston toward the other restriction.

3. In a hydraulic shock absorber, an elongated cylinder having restricted openings adjacent its respective ends, a reservoir surrounding the cylinder, liquid in the cylinder and reservoir, a spring-loaded valve normally closing the restricted opening adjacent the inner end of the cylinder, a piston operable in said cylinder and adapted to cause a discharge of liquid past said spring-loaded valve on one stroke and a discharge through the other restricted opening on the opposite stroke, means connected with the piston for actuating the same, and a conduit having one end arranged to receive the discharge from said other restricted opening and its other end submerged in the reservoir liquid, said conduit providing an open return passage which terminates in the reservoir adjacent said spring-loaded valve.

4. In a double acting tubular shock absorber, a reservoir, an elongated cylinder having a restricted discharge opening connecting the inner end thereof with said reservoir and a restricted passage leading into the reservoir from adjacent the outer end of the cylinder, a valve for said opening, a spring acting on said valve to seat the same but permitting opening thereof toward the reservoir, a hollow piston operable in the cylinder and adapted upon movement toward the inner end thereof to subject the liquid therein to pressure for causing a discharge of liquid past said valve into the reservoir and upon movement toward the outer end to cause a discharge of fluid through said restricted passage into the reservoir, an actuating rod extending into the cylinder and hollow piston and having an abutment engageable with a portion of the piston to provide a positive connection for outward movement of the piston, a spring in said hollow piston adapted to yield during application of thrust tending to move the piston toward said restricted opening, and adjustable means accessible from the outside of said cylinder for varying the effect of the first mentioned spring on said valve, said restricted passage opening into the reservoir at a point adjacent said valve.

NEAL E. ROUTSON.